United States Patent [19]
Maeda et al.

[11] 3,856,130
[45] Dec. 24, 1974

[54] APPARATUS FOR REMOVING PIPES FROM A CONVEYOR

[75] Inventors: Kazuo Maeda; Muneto Takizawa, both of Chibaken; Yuzi Saito, Kanagawaken, all of Japan

[73] Assignee: Mitsui Shipbuilding and Engineering Co., Ltd., Tokyo, Japan

[22] Filed: May 24, 1973

[21] Appl. No.: 363,505

[30] Foreign Application Priority Data
May 29, 1972 Japan.............................. 47-53082

[52] U.S. Cl................................. 198/24, 214/1 P
[51] Int. Cl......................................... B65g 47/34
[58] Field of Search............ 198/24; 214/1 P, 1 PB

[56] References Cited
UNITED STATES PATENTS

| | | |
|---|---|---|
| 2,759,594 | 8/1956 | Kleoboe et al..................... 198/208 |
| 2,868,348 | 1/1959 | Thurman et al. .................... 198/24 |
| 2,970,704 | 2/1961 | Beckley ................................ 198/24 |
| 3,181,684 | 5/1965 | Miller .................................. 198/24 |
| 3,366,219 | 1/1968 | Schickle.............................. 198/24 |
| 3,631,959 | 1/1972 | Gipperich ........................... 198/24 |
| 3,643,818 | 2/1972 | Gallucci.............................. 198/24 |

*Primary Examiner*—Evon C. Blunk
*Assistant Examiner*—Richard K. Thomson
*Attorney, Agent, or Firm*—Howson and Howson

[57] ABSTRACT

Apparatus for removing pipes from a conveyor which can remove the pipe by one reciprocating motion of a plate. To this end, the removing plate is rotated in the middle of the forward movement thereof so as to scoop and push out the pipe in the conveyor.

3 Claims, 3 Drawing Figures

PATENTED DEC 24 1974 3,856,130

APPARATUS FOR REMOVING PIPES FROM A CONVEYOR

The present invention relates to apparatus for removing pipes from a conveyer to a working means.

An object of the present invention is to provide an apparatus which can remove a pipe from a conveyer by one reciprocating motion thereof to a working means.

To this end, in accordance with the present invention, the apparatus comprises a hydraulic cylinder, bars provided parallelly to the moving direction of the piston rod of said cylinder, a member connected to the piston rod of said hydraulic cylinder for moving said bars, springs to transmit the forward movement of said piston rod to said bars, stopping means for stopping said bars in the middle of forward movement thereof, and pipe removing plate pivotally connected to said piston rod through a link and to said bars, whereby said pipe-removing plate may be rotated so as to scoop the pipe on the conveyor by the movement of said piston rod only forward movement thereof so that the pipe may be removed from the conveyor.

Figure 1:
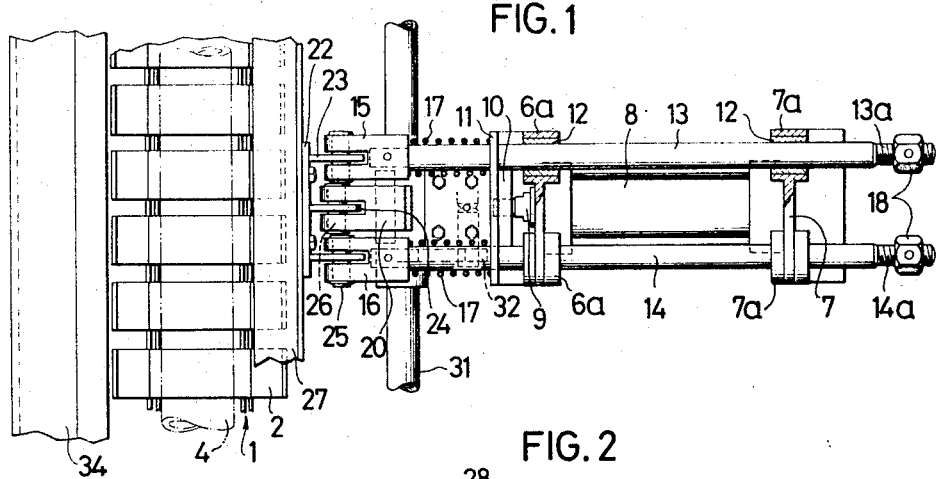
FIG. 1 is a plan view of an apparatus for removing a pipe in accordance with the present invention.
Figure 2:
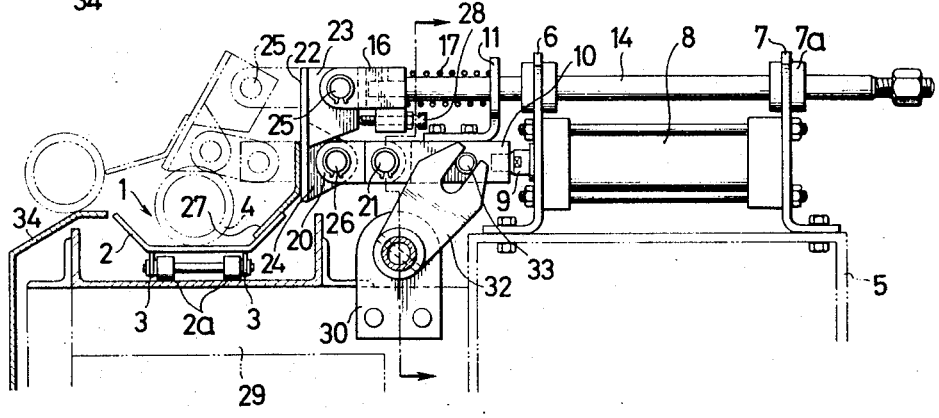
FIG. 2 is a side elevational view of the apparatus.
Figure 3:
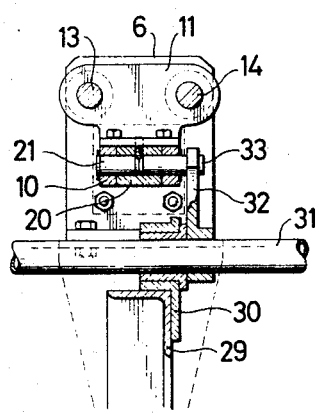
FIG. 3 is a sectional view taken along line III—III of FIG. 2.

Referring to the drawings, a conveyor 1 for conveying pipes comprises a plurality of pallets 2 connected each other by an endless chain 3 having rollers 2a. At required positions along the conveyor, several pipe removing means (only one means is shown in the drawings) are provided according to the present invention. Each removing means comprises an air cylinder 8 secured to a frame 5 by brackets 6 and 7 of which piston rod 9 extends outwardly through the bracket 6. The piston rod 9 is connected to a connecting member 10 having a plate 11. Two sliding bars 13 and 14 are slidably mounted in bushes 12 in top portions 6a and 7a of the brackets 6 and 7 and passes through an aperture of the plate 11 and have U-shaped members 15 and 16 at an ends thereof. Between the plate 11 and U-shaped members 15 and 16, springs 17 are provided respectively, so that sliding bars 13 and 14 are urged forward. At other ends of bar, nuts 18 are engaged with threads 13a and 14a respectively.

At the U-shaped portion of the connecting member 10, a U-shaped link 20 is pivotally connected by a pin 21, which in turn pivotally connected to a projecting plate 24 of a bracket 22 by a pin 26. The other plates 23 of the bracket 22 are pivotally connected to U-shaped members 15 and 16 by pins 25.

A removing plate 27 is secured to the bracket 22 to be located above the pallets 2 at one side thereof. Adjusting screws 28 threaded in the projections of members 15 and 16 abut on the projection 23 of the bracket 22 to hold it in the pallets.

In order to operate several removing apparatus, a rotary shaft 31 is rotatably supported by a bracket 30 secured to a frame 29. An arm 32 secured to the rotary shaft 31 is connected to the pin 33 of the connecting member 10 at the bifurcation.

In operation, when the pipe 4 reaches to the removing position, the air cylinder 8 is operated to cause the piston rod 9 and the connecting member 10 to push out. The forward movement of the connecting member 10 causes bars 13 and 14 to forward through springs, thereby the removing plate 27 is moved forward to push the pipe. The bars 13 and 14 are stopped by abutment of nuts 18 to the top portions 6a and 7a. Further movement of the piston rod 9 of the air cylinder 8 after stopping of bars 13 and 14 causes the connecting member 10 only to forward with compression of the springs 17. Consequently, the bracket 22 is rotated clockwise about the pin 25 as shown by dotted line, so that the removing plate 27 pushes and scoops the pipe 4 out of the conveyor 1 to the shoot 34 to remove the pipe to the other position such as working apparatus.

Thereafter, when the piston rod 9 is reversed, the bracket 22 is rotated in the counterclockwise direction so that the projection 23 abuts to the end of the adjusting screw 28. Further movement of the piston rod 9 moves bars 10 and 11 to the rearward, thereby the removing plate 28 is returned to the initial position.

The rotary shaft 31 is rotated through the pin 33 and the arm 32, and the rotation of the shaft 31 causes the other apparatus connected to the shaft to operate similarly, so that a long pipe may be removed from the conveyor.

What is claimed is:

1. Apparatus for removing a pipe from a conveyor in response to a cycle of motion of a linearly-reciprocating piston, comprising:
   connecting means secured to said piston to reciprocate linearly therewith;
   bar means mounted to be reciprocable for a predetermined distance along an axis parallel to the direction of reciprocation of said connecting means;
   spring means acting between said connecting means and said bar means and responsive to forward motion of said connecting means toward the position of a pipe to move said bar means forwardly to substantially the same extent as said connecting means, over a predetermined distance;
   stop means for arresting said forward motion of said bar means at a predetermined position before said connecting means has completed its forward stroke, said connecting means continuing its forward stroke thereafter with attendant deflection of said spring means;
   link means comprising two pivot means, one of said pivot means pivotally connecting said link means to said connecting means; and
   pipe-removing plate means pivotally mounted to the other of said pivot means and also pivotally secured to said bar means, whereby said plate means moves linearly for a predetermined distance during the initial portion of the forward stroke of said piston, and moves both forwardly and angularly in a smooth predetermined scooping motion during the latter position of said forward stroke.

2. Apparatus in accordance with claim 1, in which said spring means is positioned to be compressed by forward motion of said connecting means relative to said bar means.

3. Apparatus in accordance with claim 1, comprising additional stop means secured to said bar means for limiting the angular motion of said plate means in the direction opposite to its angular motion during said scooping motion.

\* \* \* \* \*